June 17, 1941.  W. P. POWERS  2,246,001
LIGHT MODULATOR
Filed April 1, 1940  2 Sheets-Sheet 1
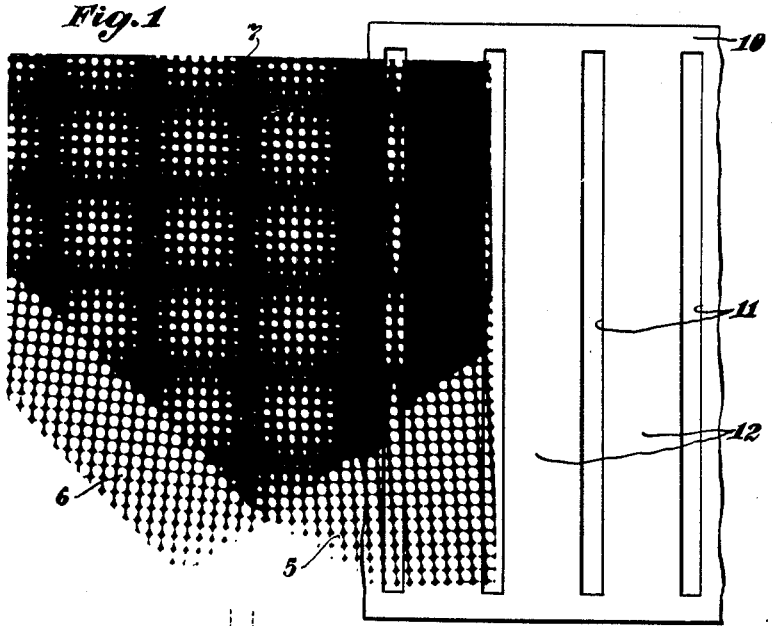
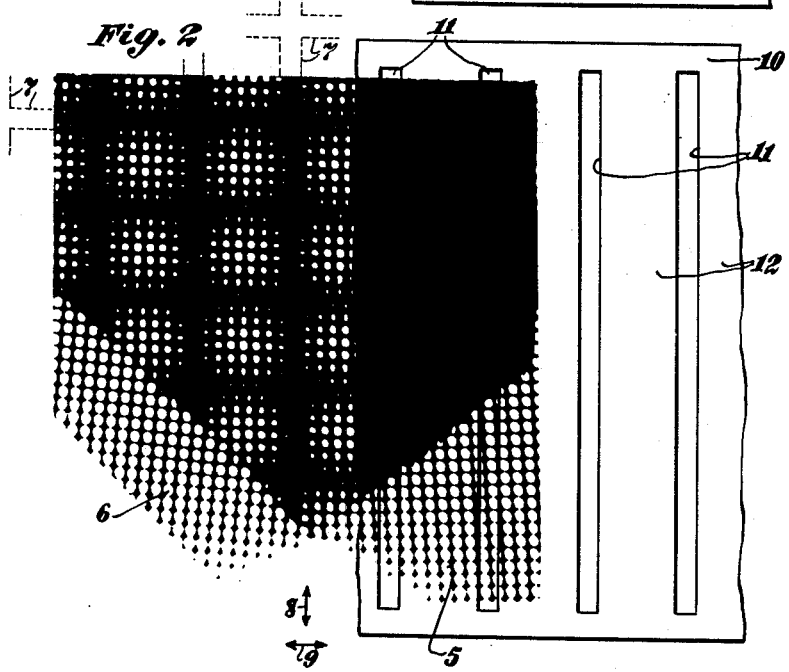
INVENTOR
Walter P. Powers,
BY
ATTORNEY June 17, 1941.  W. P. POWERS  2,246,001
LIGHT MODULATOR
Filed April 1, 1940  2 Sheets-Sheet 2
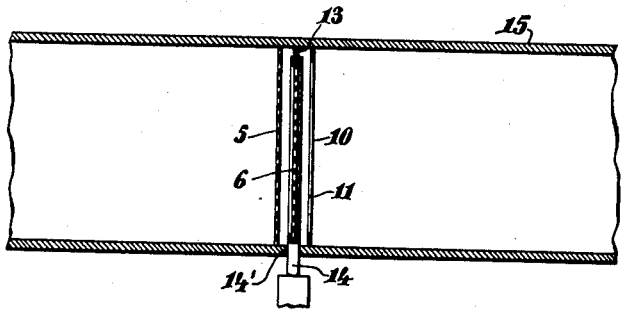
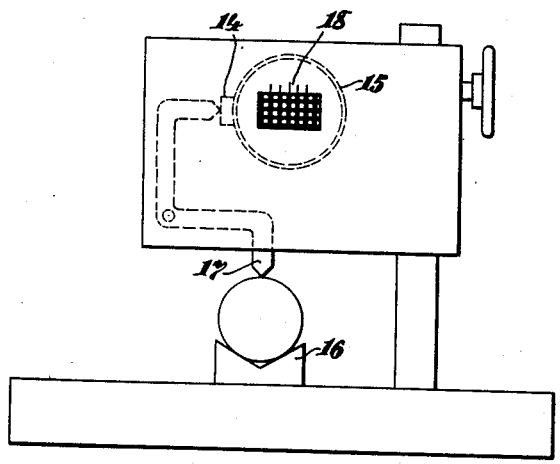
INVENTOR.
Walter P. Powers,
BY
ATTORNEY.

Patented June 17, 1941

2,246,001

UNITED STATES PATENT OFFICE 2,246,001

LIGHT MODULATOR

Walter P. Powers, East Orange, N. J., assignor to Associated Patentees, Inc., a corporation of New Jersey Application April 1, 1940, Serial No. 327,369

6 Claims. (Cl. 88—61)

The invention here disclosed relates to the modulation of light for various purposes, such as for indicating, signalling, recording, illuminating, controlling, measuring, scanning, and the like.

Objects of the invention are to accomplish the modulation of light in a simple manner, free of mechanical or electrical complications, with few parts and with the only movable part or parts of low inertia and capable of accurately responding to slight initiating impulses.

Other objects and uses of the invention will appear as the specification proceeds.

The novel features of the invention are set forth in the following specification, illustrated in the accompanying drawings and broadly covered in the claims.

The drawings illustrate the principles on which the invention is founded and also simple commercial embodiments of the invention. Such illustration however is primarily by way of disclosure, it being understood that the invention may be incorporated in many different forms, all within the true intent and scope of the invention as hereinafter defined and claimed.

Fig. 1 is a broken face view showing two grids superposed to form a control grid of larger pattern and behind these a fixed grid related to the pattern so produced by the first mentioned grids. In this view, the control pattern is in the position to pass the light through the fixed grid.

Fig. 2 is a similar view illustrating relative shifting of the control pattern to cut off passage of light.

Fig. 3 is a broken sectional view illustrating the modulator built into a light tube.

Fig. 4 is an elevation of a simple commercial embodiment of the invention.

The invention is based upon the fact that two light screens or grids, such as indicated at 5 and 6, in Figs. 1 and 2 can be superposed to produce when so combined, the effect of a phantom screen 7, of much larger mesh or pattern than either of the individual screens and which resultant screen can be shifted a quite considerable distance by a small relative adjustment of the first two screens.

By relatively shifting the two component screens 5 and 6, along one axis, as represented by line 8, the phantom screen 7, can be shifted along another axis 9, substantially at right angles thereto and without change in size or shape. Thus small relative adjustments of screens 5 and 6, may be utilized to produce larger bodily shifting movements of the phantom screen and the latter be thereby utilized as a shutter to control passage of light through a fixed screen of a pattern corresponding to the phantom control screen.

In Figs. 1 and 2, the fixed grid is indicated at 10, in back of the relatively adjustable grids 5, 6 and of a mesh or gage corresponding to or resembling the pattern of the phantom grid such that it may be partially or wholly blocked off or at least controlled to the desired extent.

In the illustration, the fixed grid 10, simply has parallel vertical slots 11, of a width and spaced to match the vertical bars of the phantom screen 7. Thus it follows that when the phantom grid lines up with the solid bar portions in register with the solid areas 12, of the fixed grid and the light passing areas between the bars in register with slots 11, as in Fig. 1, the maximum possible amount of light will be passed and that when the phantom screen is shifted to bring the solid bar portions in line with slots 11, the light will be entirely shut off, as indicated in Fig. 2. Intermediate stages of movement will produce varying intermediate light controlling effects.

Either one or both of the relatively shiftable shutter forming grids may be shifted for the light modulating purposes. In the illustration, Fig. 3, the second or inner grid 6 only is adjusted. For such purposes, it is indicated as movably supported and guided at 14', 13, and as having an actuating connection 14, operating on the axis 8, to effect a desired bodily adjustment of the light blocking or controlling phantom grid 7, in respect to the fixed grid 10.

In Fig. 3, the modulator is illustrated as mounted in a light tube 15, containing a light source. The modulated light may be variously employed, as for instance, for indicating, signalling, for electrically or photographically recording, for sound recording or for other purposes.

Another practical illustration of the invention is shown in Fig. 4, involving a limit gage having relatively fixed and movable jaws 16, 17, the latter operating the connection 14 to the movable pattern shifting grid 6. This device is shown equipped with an indicating scale 18, and may contain a light source such as in Fig. 3.

The movable grid can be small and light in weight and mounted for easy movement and thus be readily actuated by very slight impulses, such as might be created by a diaphragm, microphone or the like.

The invention makes it possible with very little energy to effect control of a considerable volume of light and this is of particular advantage in that it avoids the concentration of light into small area, with the consequent difficulties of heat dissipation and the like, which has been experienced in light modulation systems heretofore employed.

The grid size and shape may vary and be composed of fine or coarse lines or bars. Ordinarily, such lines or bars may be separated by clear spaces of equal width and the phantom grid effect be produced by having a slightly different number of the lines or bars on one grid than on the other. The lines or bars may be fully opaque and the interspaces fully clear. The lines or opaque elements while ordinarily straight and parallel may be in other shapes. Also, while ordinarily the lines or bars may be crossed to form a checker board grid, such a grid may be composed simply of spaced parallel lines. Different materials may be used. Thus the grids may be made up of woven wire screening or punched metal or other material sheets. The two relatively movable grids which combine to form the larger light shielding grid pattern constitute in effect a variable interceptor screen operable as a shutter to control passage of light through the interstices of the similar, or at least generally corresponding, larger size, usually stationary, grid screen.

What is claimed is:

1. In light modulation, the combination of a compound interceptor screen, composed of relatively movable grids combined to form a larger grid pattern, which is shiftable to a greater extent by smaller relative movements of said combined grids, a third grid approximating said larger size grid so provided, at one side of said interceptor screen and means for effecting relative movement of the grids composing said interceptor screen.

2. In light modulation, the combination of a compound interceptor screen, composed of relatively movable grids combined to form a larger grid pattern, which is shiftable to a greater extent by smaller relative movements of said combined grids, a third grid approximating said larger size grid so provided, at one side of said interceptor screen and means for effecting relative movement of the grids composing said interceptor screen along an axis, which while bodily shifting will substantially preserve the outline of said larger grid pattern.

3. In light modulation, the combination of a light shielding grid, and a control shutter therefor, composed of relatively movable grids superimposed to form a light shielding grid pattern at least generally corresponding to that of said first mentioned grid and means for effecting relative movement of said relatively movable shutter constituting grids.

4. In light modulation, the combination of a light shielding grid, and a control shutter therefor, composed of relatively movable grids superimposed to form a light shielding grid pattern at least generally corresponding to that of said first mentioned grid, means for effecting relative movement of said relatively movable shutter constituting grids along an axis which will generally preserve but effect bodily shifting movement of said light shielding grid pattern.

5. A light modulator, comprising in combination relatively movable grids associated to form a light intercepting screen of larger grid pattern than the individual grids, means for relatively shifting said grids to bodily shift the larger light intercepting grid produced by said relatively movable grids and a light shielding grid at least generally corresponding to said larger size light intercepting grid pattern and positioned to be variably controlled thereby.

6. A light modulator, comprising in combination, a pair of fine mesh grids arranged one in front of the other and cooperatively forming a light shielding grid pattern of larger size than either of said fine mesh grids, a third, large mesh grid in front of said pair of grids and having solid and open portions corresponding to the size and spacing of the solid and open portions of the larger grid pattern created by said pair of grids and means for effecting relative movement of said pair of fine mesh grids to thereby accomplish light intercepting movements of said larger mesh light intercepting pattern in respect to the corresponding third large mesh grid.

WALTER P. POWERS.